March 27, 1962  E. L. GROFF  3,027,092
RAIL JOINT
Filed May 27, 1960  3 Sheets-Sheet 1
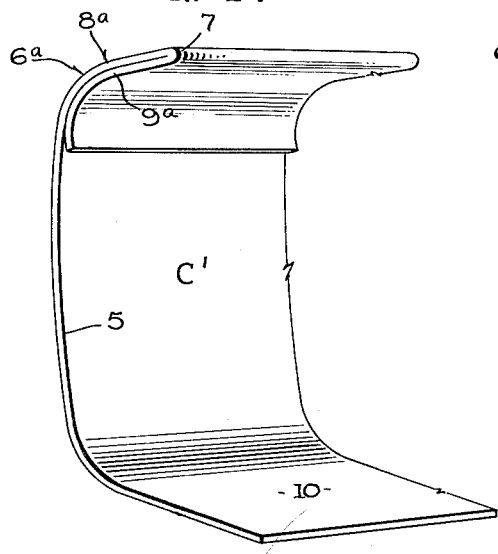
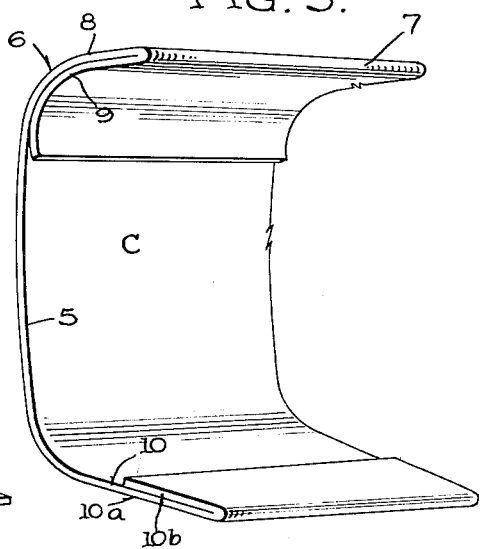
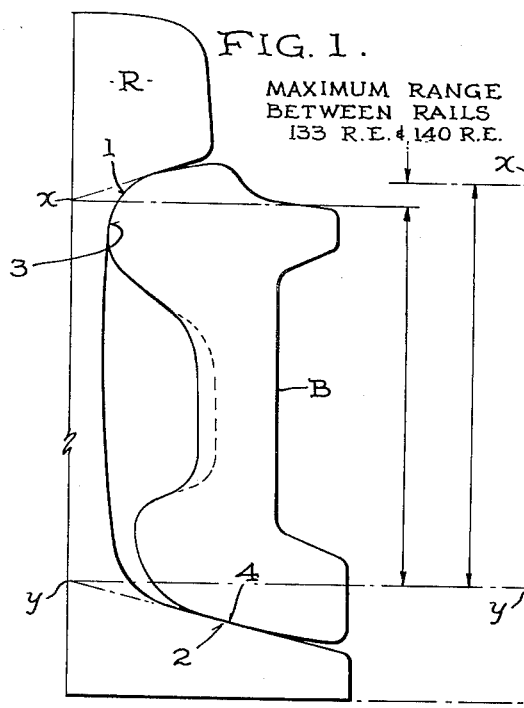
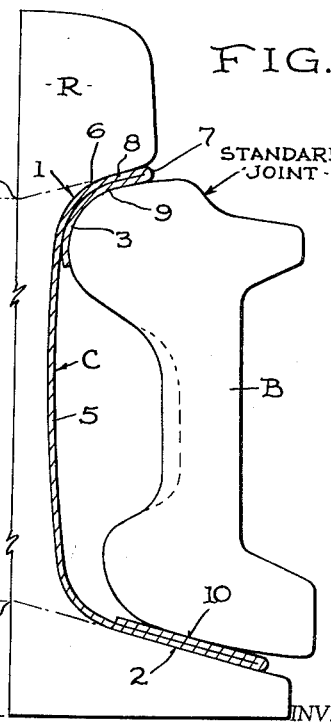
INVENTOR March 27, 1962  E. L. GROFF  3,027,092
RAIL JOINT
Filed May 27, 1960  3 Sheets-Sheet 2
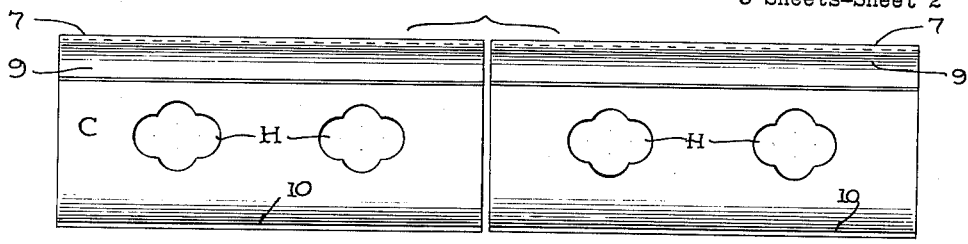
FIG. 4a.
FIG. 5.
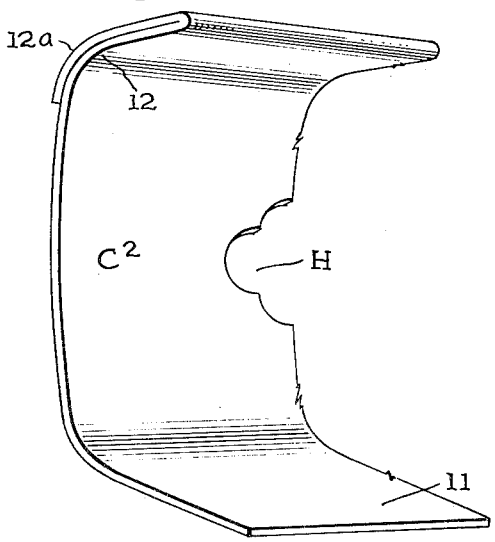
FIG. 6.
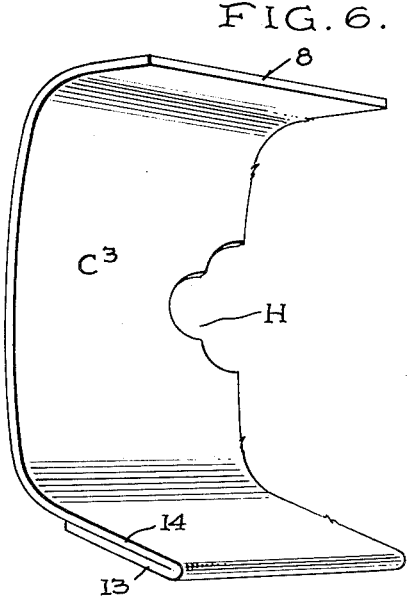
FIG. 7.
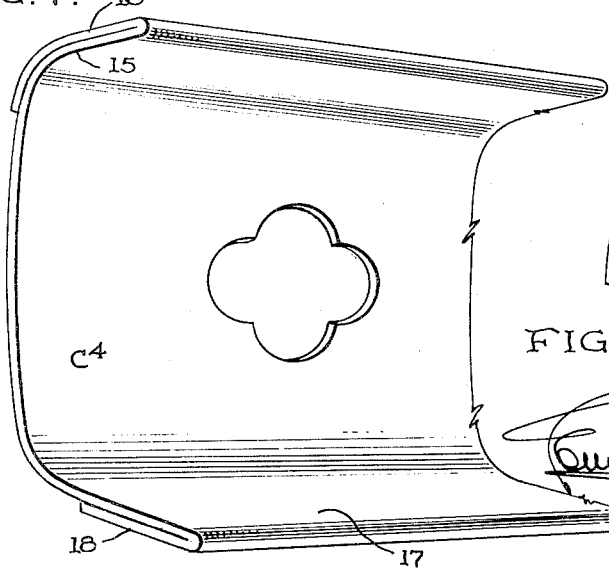
FIG. 8.
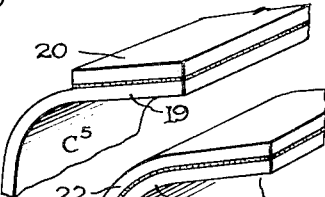
FIG. 9.
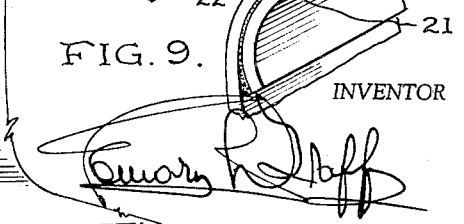
INVENTOR March 27, 1962 E. L. GROFF 3,027,092
RAIL JOINT
Filed May 27, 1960 3 Sheets-Sheet 3

INVENTOR

United States Patent Office 3,027,092
Patented Mar. 27, 1962

3,027,092
RAIL JOINT
Emory L. Groff, Bethesda, Md., assignor to Poor & Company, Chicago, Ill., a corporation of Delaware
Filed May 27, 1960, Ser. No. 32,394
2 Claims. (Cl. 238—244)

This invention relates to an improvement in means for connecting the ends of railway rails.

Railroad rails have been rolled and cropped to 39' lengths primarily because they could conveniently be put into a gondola or similar freight car in groups, or bundles, by a chain or cable sling operated by a crane and similarly unloaded at or near the site of installation. Over the last century the plants of the steel industry literally grew up on the basis of this length of rail, and all existing equipment such as cooling beds, quenching pits, etc., still used today, represents an investment of great magnitude. Therefore, it is desirable to preserve this investment as well as the practical advantages of jointed track, notwithstanding the tendency to use welded rail.

For approximately half a century it has been known to weld these sections together. At the beginning, this practice was limited to use in tunnels where temperature variations were substantially nil. However, promoters of gas and electric welding equipment persuaded the railroads that, with the advent of new anchoring techniques, such rail could be laid in open country regardless of temperature variations.

Depending upon the length of welded rail sections used in a given stretch of railway track, a greater or less number of rail joints are required. For example, if two 39' rails could be butt-welded together at the mill and shipped on flat cars, then only half as many rail joints would be required. In situations where a greater number of rail lengths are welded together adjacent the site of installation, a lesser number of rail joints are used. In signal track installations, lengths of welded rail cannot be longer than the signal actuating section, and in this case the meeting ends of welded lengths must be connected by insulated joints.

If welded rail breaks, as it often does, a section may be cut out with a torch, a new section re-welded in place or the ends of the old rail drilled and replaced by joint bars of a section to fit the fishing of the particular rail. As of now, a transitional period, such special bars may be available, but with the basic economic picture rapidly changing, it appears possible that no rolls will be available for the particular joint bar section. Moreover, many railroads prefer jointed track because, aside from its established reliability, in the foreseeable future improved mechanized installing and maintenance procedures will be available which substantially reduce labor costs.

In view of the fact that (1) railroads must be prepared to continue the use of typical proven rail sections of the past particularly in the range of the heavier sections used in main line track because of greater speeds and heavier loads, to compete with the motor-trucks on highways; and (2) also because of the fact that they will install lighter new rail sections or worn sections on secondary track and sidings, the mills will still be willing to continue rolling different rail sections because the total tonnage volume of rail will be greater than the total volume of joint bars. Steel mills only survive on a tonnage basis.

Rolls for joint bars are initially costly and costlier to maintain and this expense inherently becomes a part of the finished product. From the standpoint of the user, this high cost of joint bars was one of the factors in promoting welded rail, in addition to the labor cost of maintaining many joints. Therefore with railroads requiring fewer numbers of rail joint bars to form rail joints, the steel mills again enter the picture. That is to say, because of the increasingly high cost of turning up and servicing rolls for joint bars of different cross section and different physical properties, it becomes necessary to meet the problem by providing a single standard rail joint bar which may be rolled for use in connection with many rails having different fishing heights, thereby requiring only one, instead of two or more sets of rolls.

While rail sections vary in weight per yard, cross section and physical properties, all sections have fishing portions to receive the joint bars. However, where the weight per yard and profile characteristics vary the height of the fishing space also varies and no satisfactory determined effort has been made to standardize a single strong joint bar for use with rails having different fishing spaces.

To provide a practical solution for the problem set forth, the present invention has in view a joint bar construction comprising a strong standard or basic bar of predetermined physical characteristics for use with a rail of minimum fishing height, and which may also be used with rails of greater different fishing height through the use of a complementary fish plate. Thus, bars of standard physical properties can be rolled at a strategic location from a single set of rolls, and, the supplemental fish plate can be separately fabricated by simple available manufacturing procedures at sites close to the point of installation, as distinguished from the location of the mill.

Accordingly, a primary object of the present invention is to reduce the number of strong joint bar sections to the least common denominator and provide a composite joint bar assembly including a standard load bearing bar section of recognized physical properties and an easily fabricated fish plate which can be produced under economical conditions, readily to meet different situations in which both headfree and head contact bars are used.

Another object of the invention is to provide a simple and practical form of fish plate which will complement a bar of either the headfree or head contact type to provide initial and subsequent load bearing areas after the same fashion as a bar tailored to a rail of a given weight and fishing height.

A further object is to provide a fish plate having continuous bearing between the loading surfaces of the rails and bars and which at the same time readily lends itself to embodiment in insulated joints as well as step-joints.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 diagrammatically illustrates the example of a rail section of minimum currently used pounds per yard and having a fishing height to receive a minimum height standard headfree bar.

FIGURE 2 is a diagrammatic view illustrating the standard headfree bar of FIGURE 1 with a special complementary fish plate supplying the necessary full contact load bearing surfaces for a heavier rail of greater cross sectional area, and greater fishing height than the rail of FIG. 1 and wherein the laminated flanges are turned outwardly of the fishing space of the rail and over the loading face of the bar head.

FIGURE 3 is a detail perspective view of a modified form of the fish plate shown in FIGURE 2.

FIGURE 4 is a detail fragmentary perspective view of a modified form of fish plate wherein only the top flange is laminated.

FIGURE 4a is a side elevation of a short fish plate of the type shown in FIG. 4 arranged for example as when they are used in insulated joints.

FIGURE 5 is a fragmentary perspective view of a portion of a modified fish plate adaptable to head contact bars, wherein the upper flange of the fish plate is turned inwardly and downwardly to provide double thickness while the bottom flange retains its original thickness.

FIGURE 6 is a fragmentary perspective view of a modified fish plate on the order of FIG. 5 wherein the upper flange is of the same thickness as the web while the lower flange is of double thickness.

FIGURE 7 is a detail perspective view where both the upper and lower flanges of the special complementary fish plate provide a double thickness to be engaged by a standard head contact joint bar.

FIGURE 8 is a detail perspective view of a modification wherein the laminae of a flange may consist of a strip secured to the upper face of the top flange by an appropriate adhesive as in the case for use with a head contact bar.

FIGURE 9 is a view similar to FIGURE 8 where the laminae is appropriately secured to the underside of the top flange as in the case for use with a headfree bar.

Similar reference characters designate corresponding parts throughout the several figures of the drawings.

Figure 10:
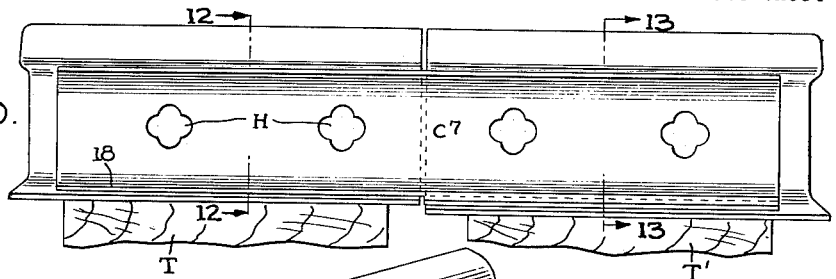
FIGURE 10 is a detail side elevation of a step-joint embodying the invention.

At the outset, it is pointed out that the rail sections shown in FIGS. 1 and 2 are to reduced scale but are copied from accurate prints.

Referring to FIGURE 1, it will be seen that each rail end R is provided with the upper load bearing fillet 1 and the bottom flange loading surface 2 respectively engaged by the arcuate head 3 of the headfree bar B while the base loading surface 4 engages the said inclined surface 2 of the base flange of the rail.

Inasmuch as the bar B shown in FIGURE 1 is the primary, standard, or basic strong bar to be rolled, it will be understood that whenever a bar is hereinafter referred to throughout the specification and drawings, it is a joint bar having head and base portions connected by a web provided with bolt holes to receive bolts for pulling the bars toward the fishing of the rail.

In FIGURE 1, the rail section profile corresponds to that of a 133# R.E. section and the bar is of the headfree type.

In FIGURE 2, the standard bar of FIGURE 1 and the complementary fish plate C of FIGURE 3 is applied to a 140# R.E. rail whose fishing is greater than the 133# R.E. rail of FIGURE 1.

Referring further to FIGS. 2 and 3, it may be pointed out that the fish plate C comprises a web 5 and an upper flange 6 which is doubled or folded upon itself as indicated at 7 to provide gap-filling and load bearing laminations 8 and 9, between the head of the standard bar B and the head-web fillet 1 of the rail. In this case, the bottom flange 10 is also likewise laminated to a double thickness as indicated at 10a and 10b. Thus, the top and bottom flanges present laminations totaling four thicknesses of the sheet material from which the fish plate is made.

By way of illustrating the flexibility and adaptability of the present invention to variable fishing gaps reference may be made to FIG. 4. In this view the complementary special fish plate $C^1$ has its top flange 6a only laminated as shown at 8a and 9a while its bottom flange is of the same thickness as the web. This type of fish plate $C^1$ of FIGURE 4 would be used where the fishing gap to be filled would be three times the normal thickness of the metal sheet from which the plate was made.

In FIGS. 2 and 3, the upper and lower flanges respectively of these figures are increased in depth by folding the metal of the upper and lower flanges of the fish plates outwardly and downwardly upon itself, to provide laminations whose curvature fully conforms to the arc of the headfree bar as well as the head-web fillet of the rail so that full and complete bearing will exist between the load bearing surfaces.

Thus, this special fish plate and its flanges provide full even bearing continuously between the head and foot portions of the bar with the related loading faces of the fishing space of the rail ends and fully and effectively transmit bolt pressure to all areas of the contacting load bearing surfaces.

As will be seen, FIG. 4a is a side elevation of a pair of the special fish plates or their counterparts according to FIG. 3 as arranged in an insulated joint, and whose upper and lower flanges are continuous throughout the length of the web as distinguished from being only partially coextensive with the web, and thereby provide laminations of total uniform thickness throughout.

In the case of insulated joints, it will be understood that the usual channel type preformed hard fiber insulation, or insulating adhesive may be used to completely span the load bearing faces of the bars and rails. Thereafter, the special fish plates will be made in two parts, instead of one continuous length so that they will not span the gap between the rail ends. That is to say, the fishing gap to be filled in an insulated joint may be composed of both the flanges of the hard fiber insulation and one or more laminated flanges of the complementary metal fish plate.

FIGURE 5 is a detail perspective view of a modified complementary fish plate $C^2$ wherein the bottom flange 11 is of single thickness while the top flange is of double thickness to provide laminations 12 and 12a.

The reverse of the situation illustrated in FIGURE 5 is shown in FIGURE 6, wherein the complementary fish $C^3$ has its bottom flange doubled upon itself to provide laminations 13 and 14 while the top is a flange of single thickness.

FIGURE 7 illustrates a complementary fish plate $C^4$ wherein the top and bottom flanges respectively have integrated laminations 15, 16 and 17, 18, to provide a double thickness, in both cases, where maximum thickness is obtained by turning the metal inwardly so that the downturned portion of the flange faces the rail web.

The special fish plates C and $C^1$ of FIGS. 1–4, have thin laminated flanges formed to be suitable for headfree contact bars in the respect that the bar head and rail fillet will readily conform to the lamina with which it engages.

On the other hand, where the bar does not engage the head web fillet of the rail, as in the case of head contact bars, the lamina may be turned inwardly toward the fishing space of the rail as shown in FIGS. 5, 6 and 7.

Referring to FIG. 8, it will be observed that the flange 19 of special splice bar $C^5$ is provided with a laminae strip 20 which may be securely attached thereto by an epoxy resin type adhesive or welding. Here again, this arrangement is effective for head contact bars. On the other hand, where headfree bars are used, the laminae strip 21 may be used at the underside of the flange 22 as shown in FIGURE 9.

From the foregoing it will be understood that once the standardized bar has been provided for use with the full range of fishing height in the most often used rails, the complementary fish plate, with one or more laminated flanges, may be readily formed in any appropriate well known manner by cold rolling or pressing to provide flange thickness to fill the fishing gap.

In all cases the webs of the special fish plates, have substantially clover-leaf type bolt holes H to accommodate different bolts spacing as may occur in different rail sections. In other words, since the present joint bar assembly is intended to provide a unit consisting of a primary standarized bar and fish plate, the only adjustment essentially to be considered is the possible differential existing in the location of the axes of the bolts to pass through the rail. This type of bolt hole H will take care of a wide range of variation involved.

In connection with all of the complementary fish plates C–C⁴ inclusive, it will be understood that any appropriate gauge of properly annealed cold sheet metal may be utilized, and which may be readily formed in a simple press or by light rolls, such, for example, as those currently employed in fabricating metal lumber used in building construction as in contrast with the heavy and expensive rolls needed for hot rolling the joint bars. Preferably the sheet is provided with a rust proofing coating at the sheet mill.

As a matter of general practice, the sheet metal constituting the complementary fish plates can be purchased from any strip mill and then shaped as above indicated to suit the particular specification. In all cases it is desirable to use metal sheet having an appropriate grain structure produced by adequate annealing which will prevent cracks at the places where the laminae are folded.

The bars shown in FIGURES 1–4 are known in the industry as strong bars in the respect that their physical properties are such that they may be used with standard bolt pressures, that is up to 20,000# per bolt to clamp the bars to the bearing faces of the rail fishings in the tightest possible relation to the rail ends.

By way of further illustrating the range of application of the invention, reference may be made to FIGS. 10–13 which illustrate a step joint wherein the complementary fish plates are used to connect rails of different cross section and weight in track.

Heretofore, it has been necessary to cast or forge step joints, and since they are used only where it is necessary to connect two dissimilar rail ends, they are expensive. By utilizing a standard bar, such as the bar of the smaller rail, it is possible to make the complementary fish plate so that it will accommodate the two rail ends and properly and rigidly connect their load bearing surfaces.

Figure 11:
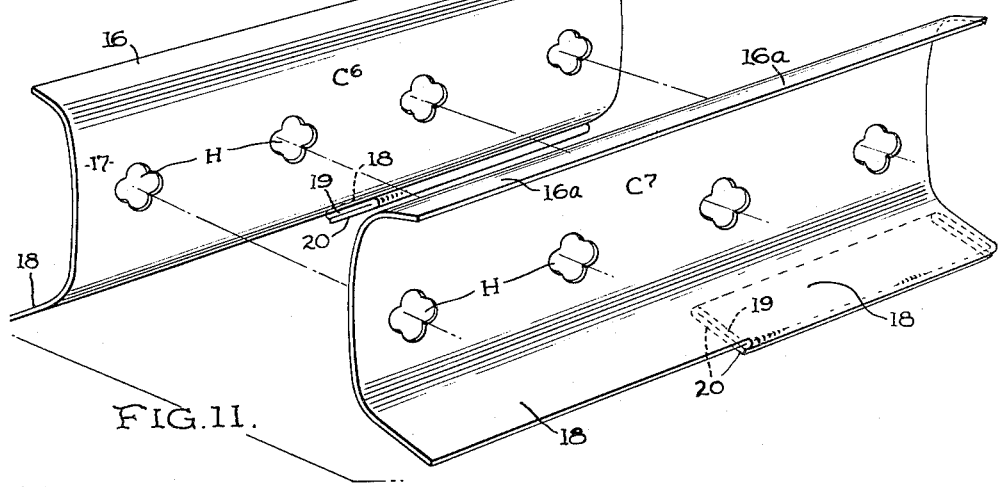
FIGURE 11 is a composite perspective view of two complementary fish plates used in FIG. 10.
Figure 12:
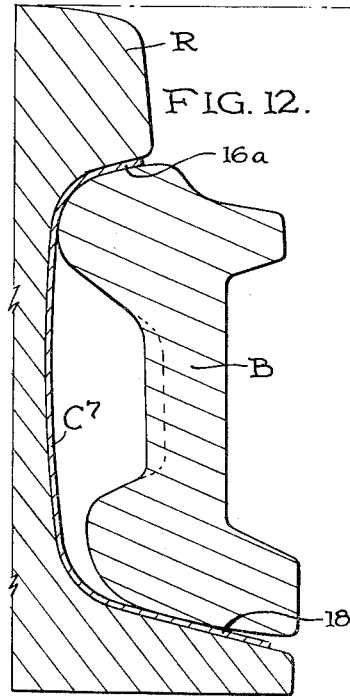
FIGURE 12 is a vertical cross-sectional view taken on the line 12—12 of FIG. 10.
Figure 13:
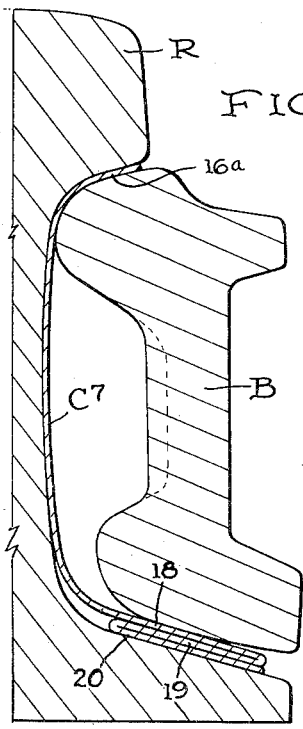
FIGURE 13 is a vertical cross-sectional view taken on the line 13—13 of FIG. 10.

As will be apparent from FIGURES 10 and 11, the complementary fish plates C⁶ and C⁷ may be readily formed to fit the gauge side of the rail as well as the field side, and support both rail ends. The base of the lighter and, therefore, shorter rail may, in accordance with the practice in the art, rest upon the tie T which is elevated in the ballast while the tie T' for the heavy rail maintains its normal lower level in the ballast.

In aligning rails in a step joint, the heads of the ball portions of the rail ends as well as the gauge sides, must be accurately flush to avoid presenting any obstruction to the wheel flange passing over the rail. Therefore, at the gauge side of the rails ends, the plates C⁶ and C⁷ will have their upper flanges 16, of uniform thickness continuously throughout, so as to nest snugly within the registering head fillets of both rails, particularly where the rail ends are joined by headfree bars.

Referring to both complementary fish plates, it is pointed out that in addition to the top flanges 16—16a and webs 17, their lower flanges 18 in the zone of the deeper and heavy rail are doubled upon themselves as indicated at 19 and 20 to provide three thicknesses to conform to and positively and rigidly fill the gap between the undersides of the bar and the base flange of the heavy rail section.

Referring further to FIGURE 11, it may be stated that although the top flanges 16 are of uniform vertical thickness throughout their length, in a case where the field sides of the rail ends do not align a slight lateral jog that might occur. The bottom flange 18 additionally includes the laminae 19 and 20 which terminate approximately midway of the plate.

FIGURES 1 and 2 and 12 and 13, illustrate, on an accurate but necessarily reduced scale, the maximum range of fishing height between a 133 R.E. rail and a 140 R.E. rail.

The slope of the underside of the rail head and upper face of the base flange of the rail are both 1:4 and diverge outwardly from points $x$ and $y$ in the web. Thus, the height of fishing space is gauged by slope aforesaid and the distance between said points.

The single-standard bar used for the purpose of illustration is rolled to fit the rail of minimum fishing, for example, the 133# R.E. rail whose total fishing height is three and fifteen-sixteenths of an inch between $x$ and $y$.

The 140# R.E. rail has a total fishing height of four and three-sixteenths inches, a difference of four-sixteenths, or one quarter of an inch. Thus in the examples shown, the complementary fish plate being of one-sixteenth inch thick stock, the primary upper and lower flanges of the laminae serve for one-half of the distance or one-eighth of an inch, and the laminae 9 and 10ᵇ, FIG. 2, make up the additional one-eighth inch to provide the full one-quarter inch for solid load bearing.

In FIGS. 10–13 where it is intended to show the same rail sections of FIGS. 1 and 2, the upper continuous flanges 16, 16ᵃ, and part of lower flange 18 plus the laminae 19 and 20 will be equal to the fishing height of the heavy rail.

It will be understood that the complementary fish plate may be made of different thickness or sheet gauge, but the example given is preferred because it renders itself more readily to a range found in the fishing of most used rails and also facilitates bending into folds at the flanges.

From the foregoing it will now be seen that the desirable feature of using a standard strong bar plus a fish plate which may be readily fabricated in a simple procedure, provides a very flexible composite joint which will take care of a wide range of situations in an economical and practical manner.

I claim:

1. In the art of constructing jointed railway tracks, the combination comprising, rail rolled in at least two standard rail sections respectively of relatively light and relatively heavy weight and having fishing spaces of different height, joint bars rolled to fit the fishing of the lighter rail section, and supplementary fish plates for said joint bars when used with rails of heavy weight, said supplementary fish plates of relatively thin gauge metal coextensive in length with the joint bar and each including a web having substantially cruciform bolt holes formed on elongated vertical and horizontal axes to enable the supplementary fish plates to adjust themselves to different vertical and horizontal centers of the bolt holes of rails of the same or of different weight, top and bottom flanges for the web of said supplementary fish plate, at least one of said flanges of a thickness to compensate for the difference in the fishing height between the bar rolled for the lighter rail and the fishing space of the heavier rail.

2. An improvement in the art of constructing jointed railway track according to claim 1, wherein, light and heavy rail sections are placed in abutting end to end relation and the said thickness to compensate for the difference in fishing height of the light and heavy rails extends approximately one-half of the length of the related bar and the remainder of the flange is of single thickness to provide a step joint.

References Cited in the file of this patent

UNITED STATES PATENTS

| | | |
|---|---|---|
| 1,606,229 | Hyle et al. | Nov. 9, 1926 |
| 1,857,952 | Gadd | May 10, 1932 |
| 2,250,880 | Skeel | July 24, 1941 |
| 2,754,065 | Hawley | July 10, 1956 |

FOREIGN PATENTS

| | | |
|---|---|---|
| 614,120 | France | Sept. 11, 1926 |
| (Addition to 31,855; 614,120) | | Mar. 1, 1927 |
| 378,168 | Great Britain | Aug. 11, 1932 |